United States Patent
Tsuiki

(10) Patent No.: US 7,353,344 B2
(45) Date of Patent: Apr. 1, 2008

(54) STORAGE DEVICE

(75) Inventor: Jun Tsuiki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 463 days.

(21) Appl. No.: 10/972,771

(22) Filed: Oct. 26, 2004

(65) Prior Publication Data

US 2006/0026368 A1    Feb. 2, 2006

(30) Foreign Application Priority Data

Jul. 30, 2004 (JP) .......................... 2004-223847

(51) Int. Cl.
*G06F 13/00* (2006.01)

(52) U.S. Cl. ................. 711/154; 711/100; 711/156; 711/166; 714/702; 714/710; 710/1; 710/52

(58) Field of Classification Search ............... 711/100, 711/154, 156, 166; 714/702, 710; 710/1, 710/52

See application file for complete search history.

(56) References Cited

U.S. PATENT DOCUMENTS

| | | | | |
|---|---|---|---|---|
| 5,359,568 A | * | 10/1994 | Livay et al. ............... | 365/221 |
| 5,917,506 A | * | 6/1999 | Hsu ............. | 345/558 |
| 6,065,070 A | * | 5/2000 | Johnson .............. | 710/22 |
| 6,442,646 B1 | | 8/2002 | Tsuruta | |
| 6,629,226 B1 | * | 9/2003 | Paul et al. ................. | 711/169 |
| 2002/0103960 A1 | | 8/2002 | Sinclair | |
| 2004/0205303 A1 | * | 10/2004 | Naveh et al. .............. | 711/144 |
| 2005/0193161 A1 | * | 9/2005 | Lee et al. ................... | 711/103 |

FOREIGN PATENT DOCUMENTS

| | | | |
|---|---|---|---|
| EP | 0758770 | * | 2/1997 |
| EP | 869430 | | 10/1998 |
| JP | 5-241936 | | 9/1993 |

OTHER PUBLICATIONS

European Search Report dated Oct. 14, 2005 in Appln. No. 04256640.6.
Patent Abstracts of Japan, Publication No. 09-167078 published Jun. 24, 1997*.

* cited by examiner

*Primary Examiner*—Stephen C. Elmore
*Assistant Examiner*—Daniel Kim
(74) *Attorney, Agent, or Firm*—Staas & Halsey LLP

(57) ABSTRACT

The present invention relates to a storage device which receives input of data of arbitrary data length, stores the data, and outputs the stored data in order of input. It provides a storage device capable of unloading data of arbitrary data length from data areas quickly. The storage device is equipped with a start position pointer which additionally stores the write position before the change each time a write position memorized by a write pointer is changed due to data input. When areas are freed, new read positions are determined based on saved write positions and the number of data items to be unloaded.

1 Claim, 4 Drawing Sheets

|  | WRITE POINTER | READ POINTER | START POSITION POINTER | | |
|---|---|---|---|---|---|
| INITIAL STATE | 0 | 0 | – | – | – |
| DATA PACKET(1) IN STORED STATE | 10 | 0 | 0 | – | – |
| DATA PACKET(2) IN STORED STATE | 30 | 0 | 0 | 10 | – |
| DATA PACKET(3) IN STORED STATE | 45 | 0 | 0 | 10 | 30 |
| DATA PACKET(1), (2) IN UNLOADED STATE | 45 | 30 | 30 | – | – |

STORAGE DEVICE

BACKGROUND OF THE INVENTION

1. Field of the Invention

The present invention relates to a storage device which receives input of data of arbitrary data length, stores the data, and outputs the stored data in order of input.

2. Description of the Related Art

Recently, various data communications including packet communications on networks typified by the Internet and communications of image data obtained by digital cameras have been used widely. Such communications employ buffer devices to store transmitted data temporarily to retransmit data in case of error during data transmission.

For example, packet communications compliant with the PCI Express standard can send and receive data packets of arbitrary data length. Buffer devices used in the packet communications can temporarily store multiple data packets of arbitrary data length.

FIG. 4 is a schematic block diagram showing an embodiment of a conventional buffer device.

The buffer device shown in FIG. 4 is used for packet communications compliant with the PCI Express standard. It receives input of data packets of arbitrary data length, stores the data packets, and outputs the stored data packets in order of input. The buffer device 50 is equipped with a data buffer 51, write pointer 52, read pointer 53, data input control circuit 54, write pointer control circuit 55, data output control circuit 56, and read pointer control circuit 57.

The data buffer 51 of the buffer device 50 shown in FIG. 4 has data areas which store data packets. The size of the data areas is expressed as a power of 2.

The write pointer 52 memorizes a write position which is located in the data areas of the data buffer 51 and in which a data packet is to be stored next.

The read pointer 53 memorizes a read position which is located in the data areas of the data buffer 51 and from which a data packet is to be read next.

When inputting a data packet in the data areas of the data buffer 51, the data length of the data packet to be inputted is compared with the size of available data areas. Since the size of the data areas of the data buffer 51 is expressed as a power of 2 as described above, the size of available data areas is given in binary format by equation (1) below.

(Size of available data areas)=(Size of data areas)−(Write pointer)+(Read pointer)  (1)

The data input control circuit 54 receives input of a data packet, determines the size of available data areas using equation (1) and stores the inputted data packet in the write position located in the data areas of the data buffer 51 and memorized by the write pointer 52 if the size of available data areas turns out to be larger than the data length of the data packet.

The write pointer control circuit 55 changes the write position memorized by the write pointer 52 by the length equal to the data length of the newly stored data packet each time a data packet is stored by the data input control circuit 54.

The data output control circuit 56 reads and outputs data packets stored in the data areas of the data buffer 51, from the read positions located in the data areas and memorized by the read pointer 53, in order of input.

After the data packets are outputted by the data output control circuit 56, the read pointer control circuit 57 receives a notice (hereinafter referred to as an ACK (Acknowledgment) notice) from the external device which has received the data packets, stating that the data packets have been received successfully and requesting that areas be freed for a specified number of data items. Consequently, the read pointer control circuit 57 changes the read position memorized by the read pointer 53 by the length equal to the data length of the data packets and thereby frees the data areas occupied by the data packets.

Each data packet of arbitrary data length contains data length information which represents the data length, in its header section.

Upon receiving the ACK notice, the read pointer control circuit 57 of the conventional buffer device 50 shown in FIG. 4 reads the data length information from the header section of a specified data packet and changes the read position by the length equal to the data length indicated by the data length information read out. Thus, the conventional buffer device 50 has a problem in that data length is read each time a data packet is unloaded from a data area of the data buffer 51, adding to processing time.

In packet communications compliant with the PCI Express standard, it is permissible to send a notice for a collection of multiple data packets. The read pointer control circuit 57 reads the data length information from the header section of the foremost data packet in the data buffer 51 among the multiple data packets specified in the notice and then determines the head position of the next data packet based on the data length represented by the data length information. Then, the read pointer control circuit 57 reads the data length information about from the determined head position to the next data packet and repeats this process. This further increases the processing time required to unload data packets from data areas of the data buffer 51. This may cause problems of reduced communications speed.

SUMMARY OF THE INVENTION

The present invention has been made in view of the above circumstances and provides a storage device capable of unloading data of arbitrary data length from data areas quickly.

The present invention provides a storage device which receives input of data of arbitrary data length, stores the data, and outputs the stored data in order of input, having:

a data storage section with data areas which store data;

a write pointer which memorizes a write position in the data areas where data is to be stored next;

a data input section which receives the data and stores the data in the write position located in the data areas and memorized by the write pointer;

a write pointer control section which changes the write position memorized by the write pointer by the length equal to the data length of newly stored data each time data is stored by the data input section;

a write position history storage section which additionally stores the write position before the change each time the write position is changed by the write pointer control section;

a read pointer which memorizes a read position in the data areas from which data is to be read next;

a data output section which reads and outputs data stored in the data areas, from the read positions located in the data areas and memorized by the read pointer, in order of input; and a read pointer control section which, upon receiving a notice requesting that areas be freed for a specified number of data items, erases the same number of write positions in the write position history storage section as the number of data items specified in the notice, in the order that the write positions are memorized, and makes the read pointer memorize the foremost write position among the remaining write positions as a new read position.

The storage device according to the present invention has a write position history storage section which additionally stores the write position before the change each time the write position is changed by the write pointer as a result of data input and determines a new read position based on the saved write positions and the number of data items to be unloaded when an area is freed. This eliminates the need for the process of reading the data length information from the header section of data and process of determining the head position of the next data based on the data length unlike the conventional buffer device described in the "Background Art." Consequently, the storage device according to the present invention can unload data of arbitrary data length from data areas quickly.

The present invention provides a storage device capable of unloading data of arbitrary data length from data areas quickly.

DETAILED DESCRIPTION OF THE INVENTION

Embodiments of the present invention are described below with reference to the drawings.

Figure 1:
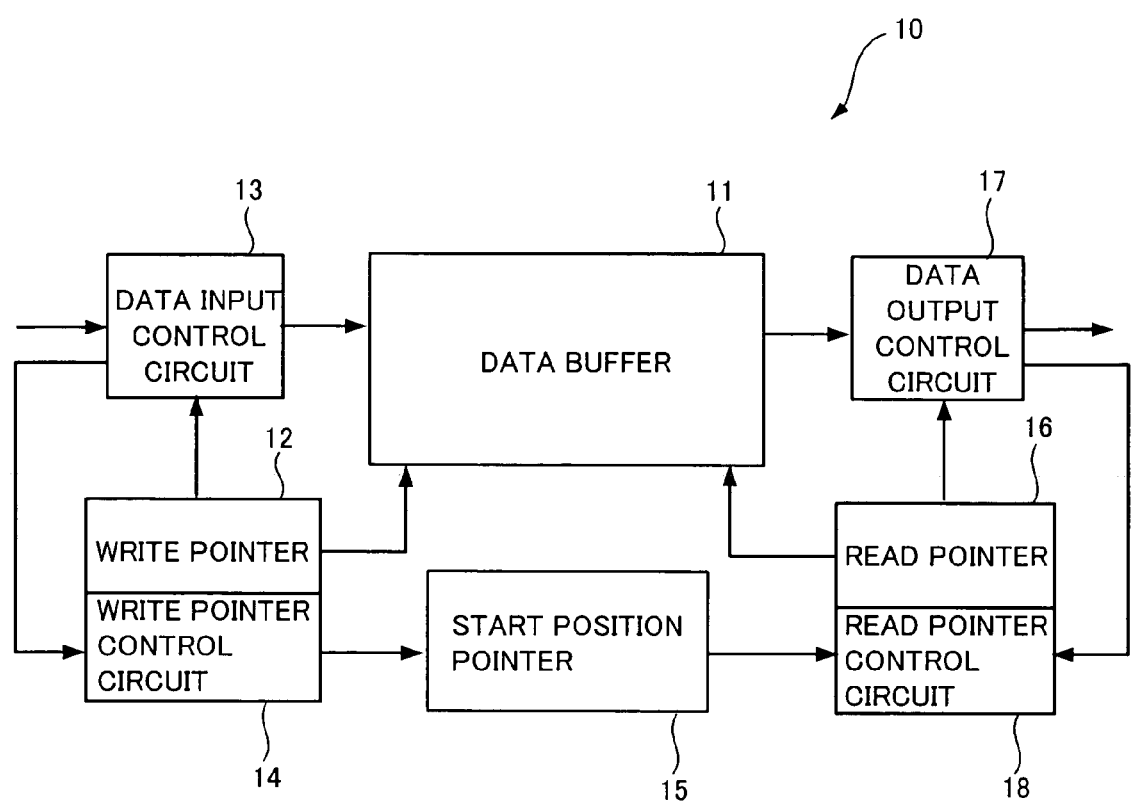
FIG. 1 is a schematic block diagram showing a buffer device which corresponds to an embodiment of a storage device according to the present invention.

FIG. 1 is a schematic block diagram showing a buffer device which corresponds to an embodiment of a storage device according to the present invention.

A buffer device 10 shown in FIG. 1 is equipped with a data buffer 11, write pointer 12, data input control circuit 13, write pointer control circuit 14, start position pointer 15, read pointer 16, data output control circuit 17, and read pointer control circuit 18.

The buffer device 10 is used in packet communications compliant with the PCI Express standard.

Operation of components of the buffer device 10 is described conceptually here and concrete operation of these components is described later.

The data buffer 11 of the buffer device 10 shown in FIG. 1 has data areas which store data packets, an example of the data according to the present invention. The data buffer 11 is an example of the data storage section according to the present invention. The size of the data areas is expressed as a power of 2.

The write pointer 12 memorizes the write position in the data areas of the data buffer 11 in which a data packet is to be stored next. The write pointer 12 is an example of the write pointer according to the present invention.

The data input control circuit 13 receives input of a data packet, determines the size of available data areas and stores the inputted data packet in the write position located in the data areas of the data buffer 11 and memorized by the write pointer 12 if the size of available data areas turns out to be larger than the data length of the inputted data packet. The data input control circuit 13 is an example of the data input section according to the present invention.

The write pointer control circuit 14 changes the write position memorized by the write pointer 12 by the length equal to the data length of the newly stored data packet each time a data packet is stored by the data input control circuit 13. The write pointer control circuit 14 is an example of the write pointer control section according to the present invention.

The start position pointer 15 additionally stores the write position before the change each time the write position memorized by the write pointer 12 is changed by the write pointer control circuit 14. The start position pointer 15 is an example of the write position history storage section according to the present invention.

The read pointer 16 memorizes a read position in the data areas of the data buffer 11 from which a data packet is to be read next. The read pointer 16 is an example of the read pointer according to the present invention.

The data output control circuit 17 reads and outputs data packet stored in the data areas of the data buffer 11, from the read positions located in the data areas and memorized by the read pointer 16, in order of input. The data output control circuit 17 is an example of the data output section according to the present invention.

Upon receiving a notice requesting that areas be freed for a specified number of data items, the read pointer control circuit 18 erases the same number of write positions in the start position pointer 15 as the number of data items specified in the notice, in the order that the write positions are memorized, and makes the read pointer 16 memorize the foremost write position among the remaining write positions as a new read position. The read pointer control circuit 18 is an example of the read pointer control section according to the present invention.

Now, the embodiment of the buffer device 10 shown in FIG. 1 is described more concretely below.

Figure 2:
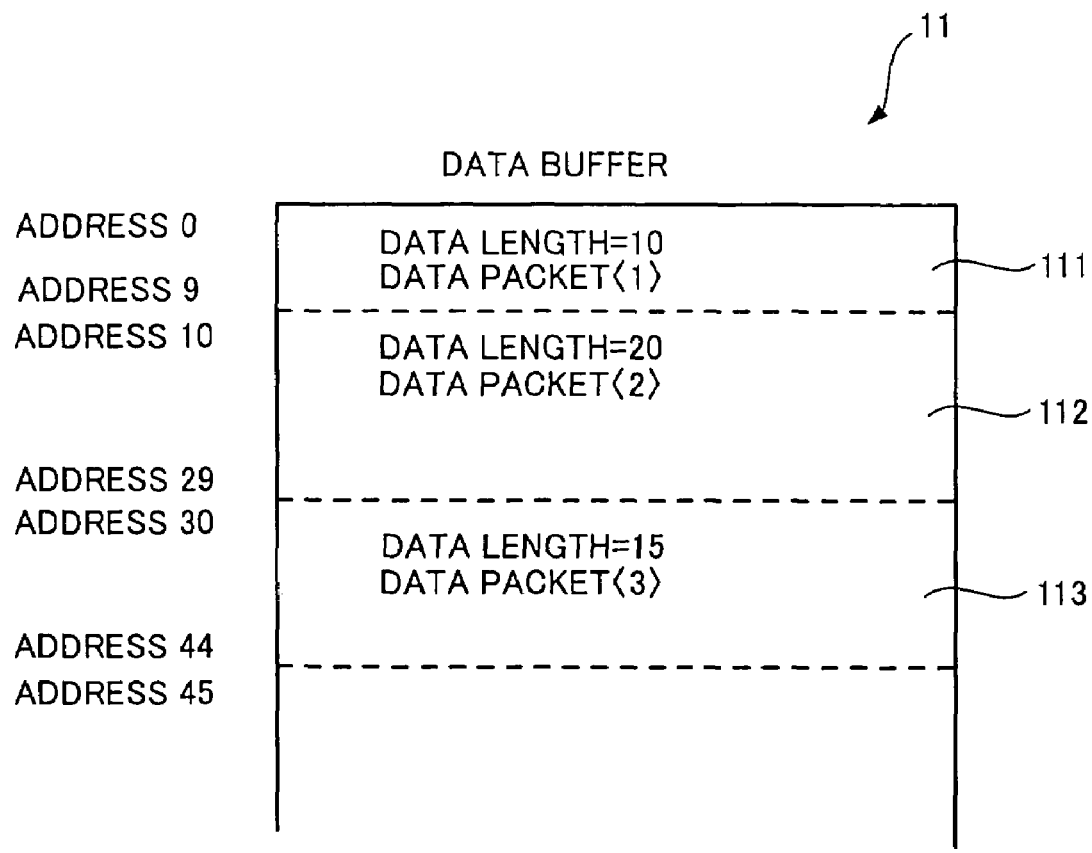
FIG. 2 is a schematic diagram showing data packets stored in data areas of the data buffer of the buffer device shown in FIG. 1.
Figure 3:
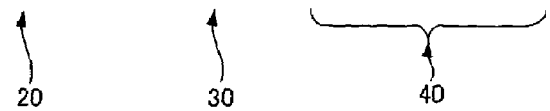
FIG. 3 is a table listing numeric values memorized by a write pointer, read pointer, and start position pointer when data packets are in a stored state in data areas of the data buffer of the buffer device shown in FIG. 1.
Figure 4:
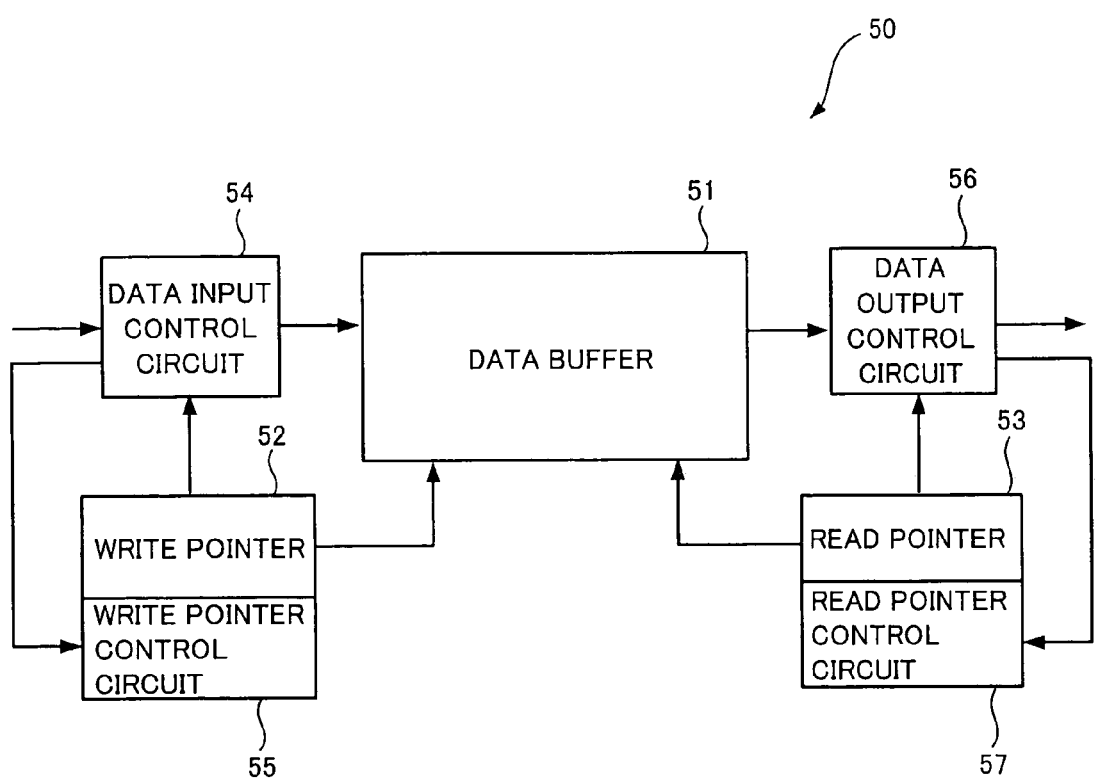
FIG. 4 is a schematic block diagram showing an embodiment of a conventional buffer device.

With reference to FIGS. 1 to 3, description is given below of an example in which data packets of arbitrary data length are stored sequentially in the data areas of the data buffer 11 of the buffer device 10 shown in FIG. 1, where the data areas initially contain no data packet, then multiple data packets stored in the data areas are outputted to an external device (not shown), and finally the data areas are freed. For ease of explanation, the same unit is used for data length and addresses.

FIG. 2 is a schematic diagram showing data packets stored in data areas of the data buffer of the buffer device shown in FIG. 1. FIG. 3 is a table listing numeric values memorized by the write pointer, read pointer, and start position pointer when data packets are in a stored state in the data areas.

Since no data is stored initially in the data areas of the data buffer 11 shown in FIG. 1 as described above, both numeric value 20 (reference numeral) of the write position memorized by the write pointer 12 and numeric value 30 (reference numeral) of the read position memorized by the read pointer 16 are "0" and numeric values 40 (reference numeral) of the write positions saved additionally by the start position pointer 15 do not exist yet as shown in the "initial state" row in FIG. 3.

When inputting a data packet in the data areas of the data buffer 11, the data length of the data packet to be inputted is compared with the size of available data areas. Since the size of the data areas of the data buffer 11 is expressed as a power of 2 as described above, the size of available data areas is given in binary format by equation (2) below.

(Size of available data areas)=(Size of data areas)−
(Write pointer)+(Read pointer)          (2)

When a data packet <1> with a data length of "10" is inputted in the buffer device 10 shown in FIG. 1, the data input control circuit 13 determines the size of available data areas using equation (2) above and stores the inputted data packet <1> in the write position "0" located in the data areas of the data buffer 11 and memorized by the write pointer 12 if the size of available data areas turns out to be larger than the data length "10" of the inputted data packet <1>. Since the data length of the data packet <1> is "10," the data packet <1> is stored in a data area 111 with address 0 to address 9 which corresponds to the write position "0" in the data buffer 11 as shown in FIG. 2. When the data packet <1> is stored by the data input control circuit 13, the write pointer control circuit 14 changes the write position memorized by the write pointer 12 by the length "10" equal to the data length of the newly stored data packet, and consequently the numeric value 20 of the write position becomes "10" as shown in the "data packet <1> in stored state" row in FIG. 3. Also, as a result of the change made by the write pointer control circuit 14 in the write position memorized by the write pointer 12, the start position pointer 15 saves "0" as the numeric value 40 of the write position before the change.

When a data packet <2> with a data length of "20" is inputted in the buffer device 10 shown in FIG. 1, the data input control circuit 13 determines the size of available data areas using equation (2) above and stores the inputted data packet <2> in the write position "10" located in the data areas of the data buffer 11 and memorized by the write pointer 12 if the size of available data areas turns out to be larger than the data length "20" of the inputted data packet <2>. Since the data length of the data packet <2> is "20," the data packet <2> is stored in a data area 112 with address 10 to address 29 which corresponds to the write position "10" in the data buffer 11 as shown in FIG. 2. When the data packet <2> is stored by the data input control circuit 13, the write pointer control circuit 14 changes the write position memorized by the write pointer 12 by the length "20" equal to the data length of the newly stored data packet, and consequently the numeric value 20 of the write position becomes "30" as shown in the "data packet <2> in stored state" row in FIG. 3. Also, as a result of the change made by the write pointer control circuit 14 in the write position memorized by the write pointer 12, the start position pointer 15 additionally saves "10" as the numeric value 40 of the write position before the change. Consequently, the numeric values 40 of the two write positions, namely "0" and "10," are saved by the start position pointer 15.

When a data packet <3> with a data length of "15" is inputted in the buffer device 10 shown in FIG. 1, the data input control circuit 13 determines the size of available data areas using equation (2) above and stores the inputted data packet <3> in the write position "30" located in the data areas of the data buffer 11 and memorized by the write pointer 12 if the size of available data areas turns out to be larger than the data length "15" of the inputted data packet <3>. Since the data length of the data packet <3> is "15," the data packet <3> is stored in a data area 113 with address 30 to address 44 which corresponds to the write position "30" in the data buffer 11 as shown in FIG. 2. When the data packet <3> is stored by the data input control circuit 13, the write pointer control circuit 14 changes the write position memorized by the write pointer 12 by the length "15" equal to the data length of the newly stored data packet, and consequently the numeric value 20 of the write position becomes "45" as shown in the "data packet <3> in stored state" row in FIG. 3. Also, as a result of the change made by the write pointer control circuit 14 in the write position memorized by the write pointer 12, the start position pointer 15 additionally saves "30" as the numeric value 40 of the write position before the change. Consequently, the numeric values 40 of the three write positions, namely "0," "10," and "30," are saved by the start position pointer 15.

It is assumed here that two data packets are read at a time by the data output control circuit 17 from the data areas of the data buffer 11 of the buffer device 10 shown in FIG. 1, sent to an external device (not shown), and received by the external device successfully. In that case, the external device sends a notice (hereinafter referred to as an ACK (Acknowledgment) notice) to the buffer device 10 informing the buffer device 10 about successful reception of the data packets and requesting the buffer device 10 to free areas for a specified number of data items, where the notice is an example of the notice according to the present invention. Since two data packets are sent here, the buffer device 10 receives an ACK notice requesting that areas for two data packets be freed. As the buffer device 10 receives the ACK notice, the read pointer control circuit 18 erases the same number of write positions in the start position pointer 15 as the number of data items, "2" in this case, specified in the ACK notice, in the order that the write positions are saved. That is, the read pointer control circuit 18 erases the numeric values "0" and "10," leaving "30" as the numeric value 40 of the write position indicated by the start position pointer, as shown in the "data packets <1>, <2> in unloaded state" rows in FIG. 3. The numeric value "30" of the foremost write position among the numeric values 40 of the remaining write positions is copied as a new read position to the read pointer 16. Consequently, "30" is memorized as the numeric value 30 of the read position. This frees the data areas occupied by the data packet <1> and the data packet <2>.

Thus, this embodiment eliminates the need to read the data length of data packets when freeing areas. Consequently areas can be freed quickly.

Incidentally, when data packets are sent from the buffer device 10 shown in FIG. 1 to the external device, if the data packets are received unsuccessfully due to a temporary communications error or the like, the external device sends a notice (hereinafter referred to as a NACK (Negative Acknowledgment) notice) to the buffer device 10 informing the latter about unsuccessful reception of all the data packets or some subsequent data packets.

If a NACK notice about unsuccessful reception of all the data packets is received from the external device, the data output control circuit 17 retransmits all the data packets. In this case, memory contents of the write pointer 12, read pointer 16, and start position pointer 15 are retained.

If a NACK notice about unsuccessful reception of some subsequent data packets is received from the external device, the number of data items received successfully is indicated in the NACK notice and the data areas for the data packets received successfully are freed using the same method as described above. That is, the areas are freed as new read positions are determined based on the saved write positions and the number of data items to be unloaded. The subsequent data packets received unsuccessfully are resent by the data output control circuit 17.

Thus, even when a NACK notice about unsuccessful reception of some subsequent data packets is received from an external device (not shown), this embodiment eliminates the need to read the data length of data packets when freeing areas for the data packets received successfully by the external device. Consequently areas can be freed quickly.

Incidentally, although the embodiment is described citing a buffer device used in packet communications compliant with the PCI Express standard, the present invention can be applied to any storage device which receives input of data of arbitrary data length, stores the data, and outputs the stored data in order of input.

Also, although the embodiment is described citing an ACK notice as an example of the notice according to the present invention, this is not restrictive, and the notice according to the present invention may be any notice that requests that areas be freed for a specified number of data items.

What is claimed is:

1. A storage device which receives input of data of arbitrary data length, stores the data, and outputs the stored data in order of input, comprising:

a data storage section with data areas which store data;

a write pointer which memorizes a write position in the data areas where data is to be stored next;

a data input section which receives the data and stores the data in the write position located in the data areas and memorized by the write pointer;

a write pointer control section which changes the write position memorized by the write pointer by the length equal to the data length of newly stored data each time data is stored by the data input section;

a write position history storage section which additionally stores the write position before the change each time the write position is changed by the write pointer control section;

a read pointer which memorizes a read position in the data areas from which data is to be read next;

a data output section which reads and outputs data stored in the data areas, from the read positions located in the data areas and memorized by the read pointer, in order of input; and a read pointer control section which, upon receiving a notice requesting that areas be freed for a specified number of data items, erases the same number of write positions in the write position history storage section as the number of data items specified in the notice, in the order that the write positions are memorized, and makes the read pointer memorize the foremost write position among the remaining write positions as a new read position.

* * * * *